(No Model.)

T. BORCHER.
FUNNEL.

No. 583,615. Patented June 1, 1897.

WITNESSES:
H. Walker

INVENTOR
T. Borcher.
BY
ATTORNEY.

THE NORRIS PETERS CO., PHOTO-LITHO., WASHINGTON, D. C.

UNITED STATES PATENT OFFICE.

THOMAS BORCHER, OF JERSEY CITY, NEW JERSEY.

FUNNEL.

SPECIFICATION forming part of Letters Patent No. 583,615, dated June 1, 1897.

Application filed March 10, 1896. Serial No. 582,522. (No model.)

*To all whom it may concern:*

Be it known that I, THOMAS BORCHER, of Jersey City, in the county of Hudson and State of New Jersey, have invented a new and useful Improvement in Funnels, of which the following is a full, clear, and exact description.

My invention relates to that class of funnels known as "plug" and "measuring" funnels; and the object of the invention is to so construct the funnel that the bowl of said funnel may be filled with liquid to a predetermined extent without the liquid entering the nozzle of the funnel, and whereby without the assistance of springs or equivalent devices the liquid may be admitted to the nozzle of the funnel from the body or bowl in a convenient and expeditious manner, and whereby also the plug may be seated in the bowl at any time during the egress of the liquid, the seating being accomplished through gravity.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
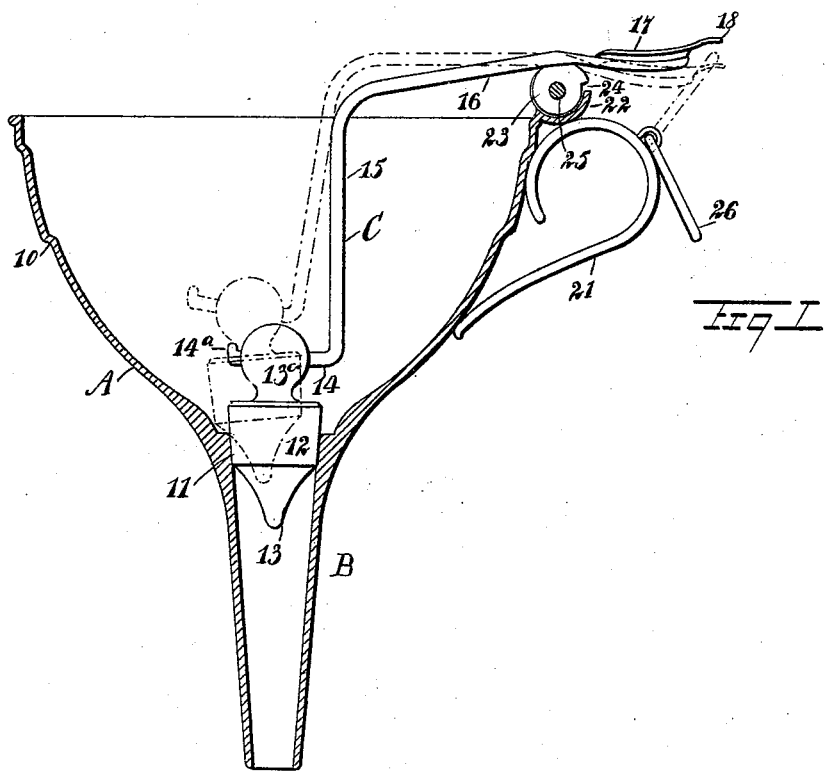
Figure 2:
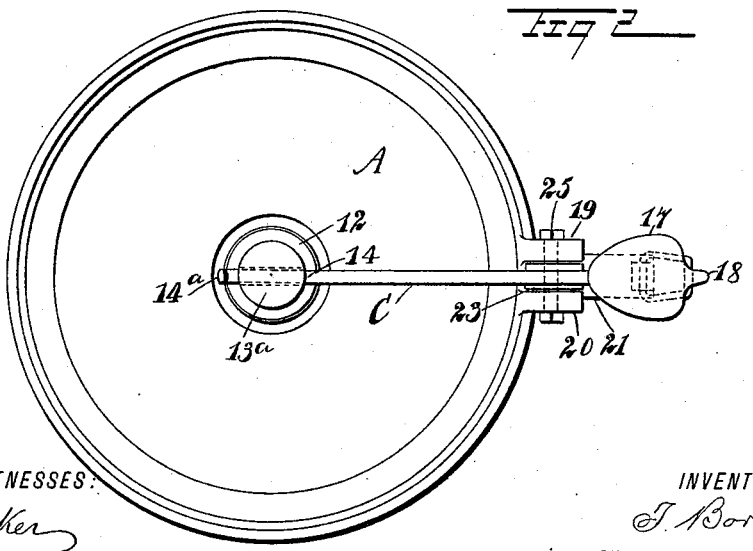

Figure 1 is a vertical section through a funnel having the improvement applied, and Fig. 2 is a plan view of the same.

In carrying out the invention the bowl A of the funnel is preferably provided with indentations or equivalent marks 10, produced circularly therein or thereon to designate predetermined quantities of liquid contained in the bowl, and the said bowl is provided with a nozzle B, which may be of any approved construction, and where the nozzle B connects with the bowl A a seat 11 is formed, adapted to receive a plug-valve 12, and the said plug-valve is provided below its body portion with a tapering extension 13, the body portion of the valve being that which is to engage with the seat, and the aforesaid body portion of the valve is likewise made somewhat tapering, as is its seat 11.

The plug-valve 12 has a head $13^a$, formed upon its upper surface, having an opening extending through from side to side, through which opening the horizontal foot 14 of an angle-lever C is loosely passed, the said foot having a stop $14^a$ at its extremity which prevents the valve from leaving the lever. The lever rises in a substantially perpendicular line from the foot 14, forming a body portion 15, and the upper portion or handle-section 16 of the said lever is carried outward beyond the upper peripheral surface of the bowl of the funnel and terminates in a thumb-rest 17, which is preferably provided with a tongue 18 at its rear end.

Two knuckles 19 and 20 are formed upon the upper peripheral portion of the bowl and preferably immediately over the handle 21 of the funnel, and a shield 22 is projected outwardly from the aforesaid knuckles, being curved upwardly to a point at or near the center of their outer faces. A third knuckle 23 is secured upon the handle portion 16 of the lever C, and the handle-knuckle 23 has a shoulder 24 made therein and is adapted to be entered between the knuckles 19 and 20 on the funnel, and the central or lever knuckle 23 is pivoted between the funnel-knuckles 19 and 20 through the medium of a pin 25 or its equivalent.

When the outer end of the lever is pressed downward, the valve 12 will be raised, but the said valve will still have guided movement in the funnel by reason of its lower projection 13, and the liquid at that time may freely flow from the bowl through the nozzle into the receptacle in connection with which the funnel is employed, and the valve may be held open when desired by passing a link 26, pivotally connected with the handle, over the tongue 18, projected from the thumb-rest of the aforesaid lever, as shown in dotted lines in Fig. 1.

It is evident that a funnel constructed as above set forth will be exceedingly simple, durable, and economic and that the funnel will be expeditiously and conveniently manipulated with one hand. It is further evident that when the lever C is pressed downward at its handle end its foot will be elevated, as shown in dotted lines, and the plug-valve 12 will slide inwardly upon the aforesaid foot-section of the lever, bringing the projecting lower conical portion in practical engagement with a wall of the valve-seat.

Having thus described my invention, I claim as new and desire to secure by Letters Patent—

1. The combination with a funnel having a valve-seat in the apex of its body, of an angle-lever having its upper member fulcrumed on the upper edge of the body of the funnel and its lower member provided with a horizontal foot, said foot having a stop at its end, and a valve provided with an apertured head through which aperture the foot loosely extends to permit the valve to slide thereon, said valve being also provided with a tapering projection on its under side, substantially as described.

2. The combination with a funnel having a valve-seat in the apex of its body and provided with knuckles on the periphery of the body and a shield below the knuckles, of an angle-lever having its lower member provided with a horizontal foot and its upper member with a knuckle pivoted between the knuckles of the funnel, said knuckles being provided with a shoulder for engaging the said shield, and a valve having a tapering projection on its under side and an apertured head, through which aperture the foot of the lever loosely extends, substantially as herein shown and described.

THOMAS BORCHER.

Witnesses:
J. FRED. ACKER,
JNO. M. RITTER.